June 14, 1949.  J. P. GRAHAM ET AL  2,473,143
ELECTROSTATIC BONDING MACHINE
Filed Feb. 7, 1945  5 Sheets-Sheet 5
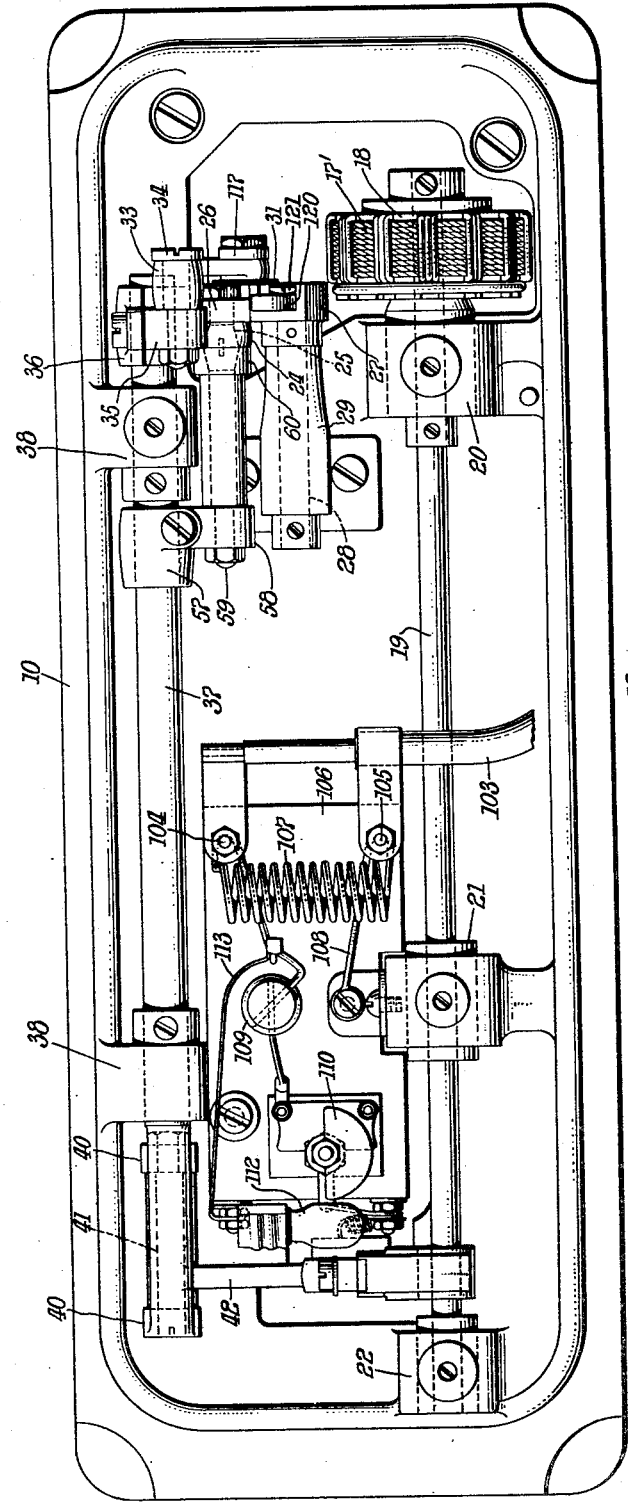
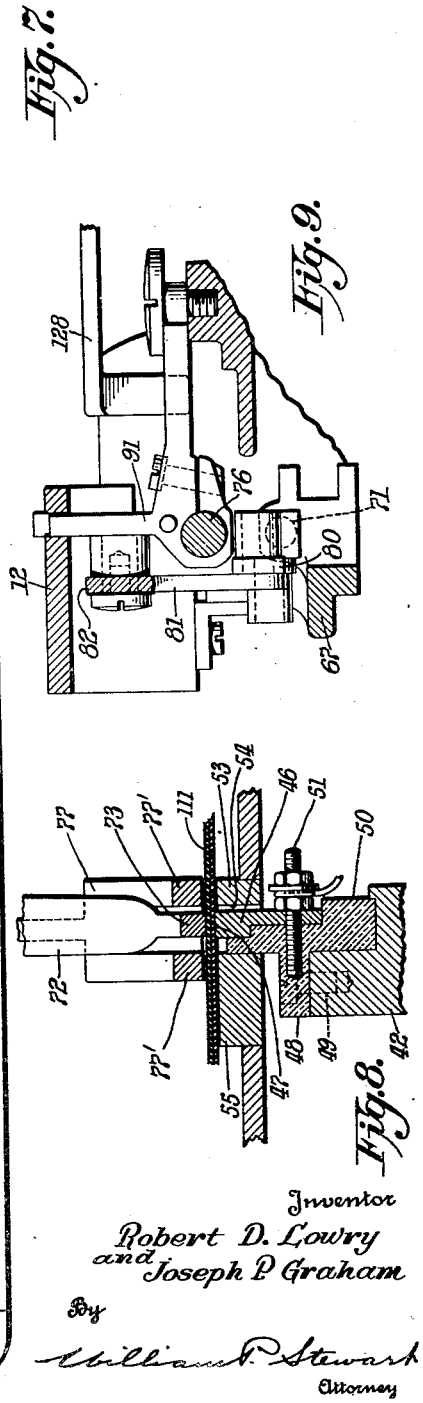
Inventor
Robert D. Lowry
and Joseph P. Graham
By
William P. Stewart
Attorney Patented June 14, 1949

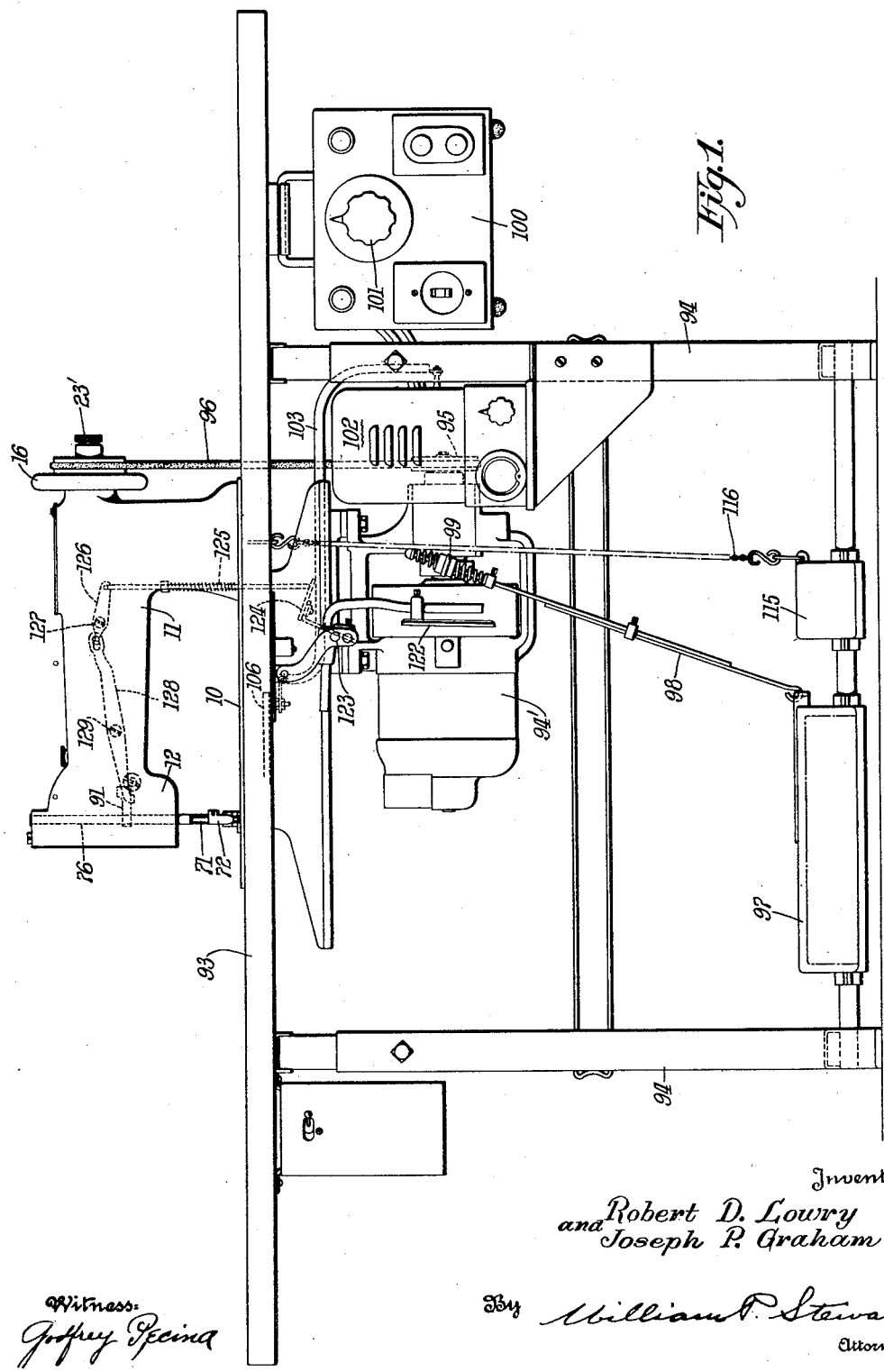

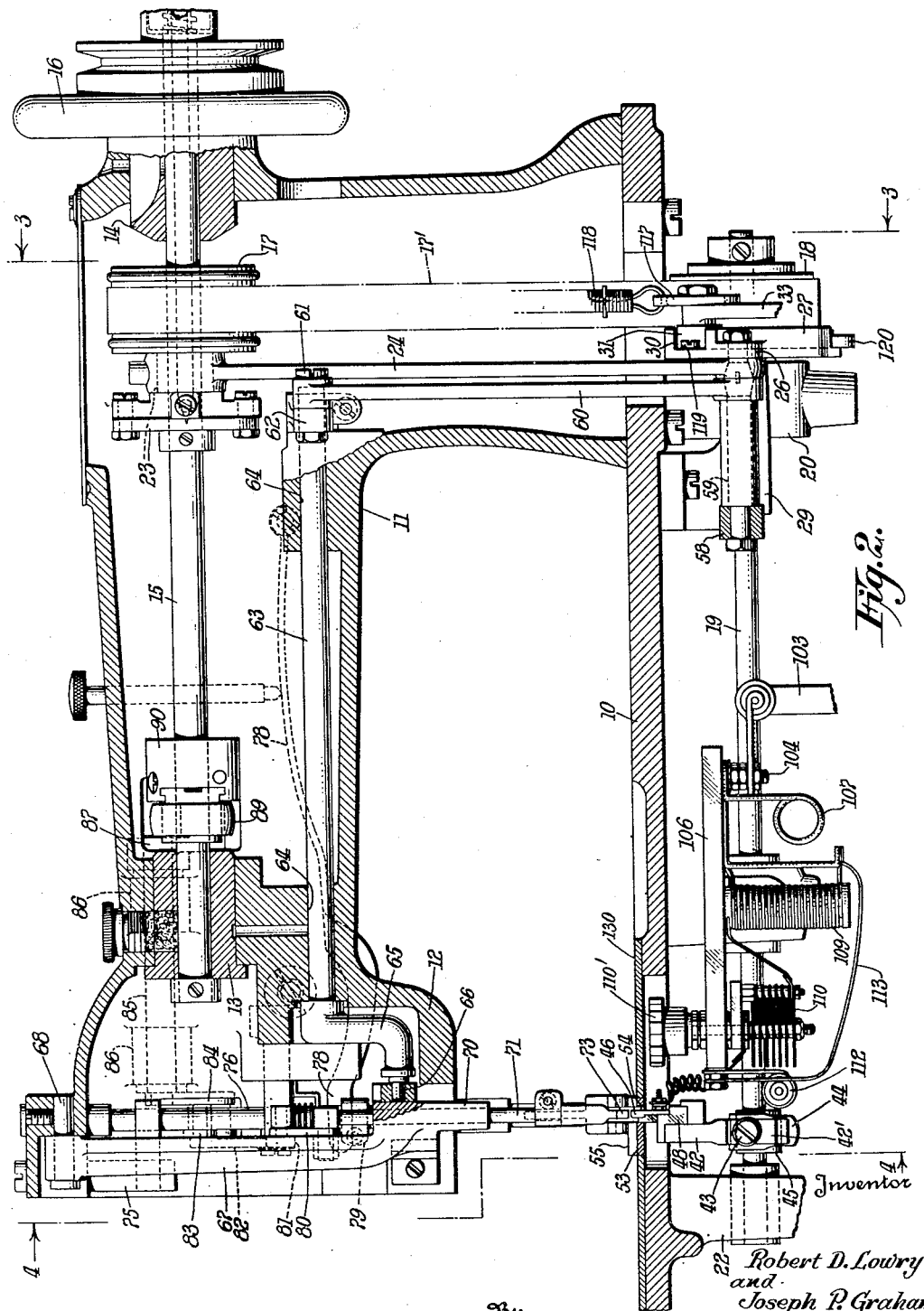

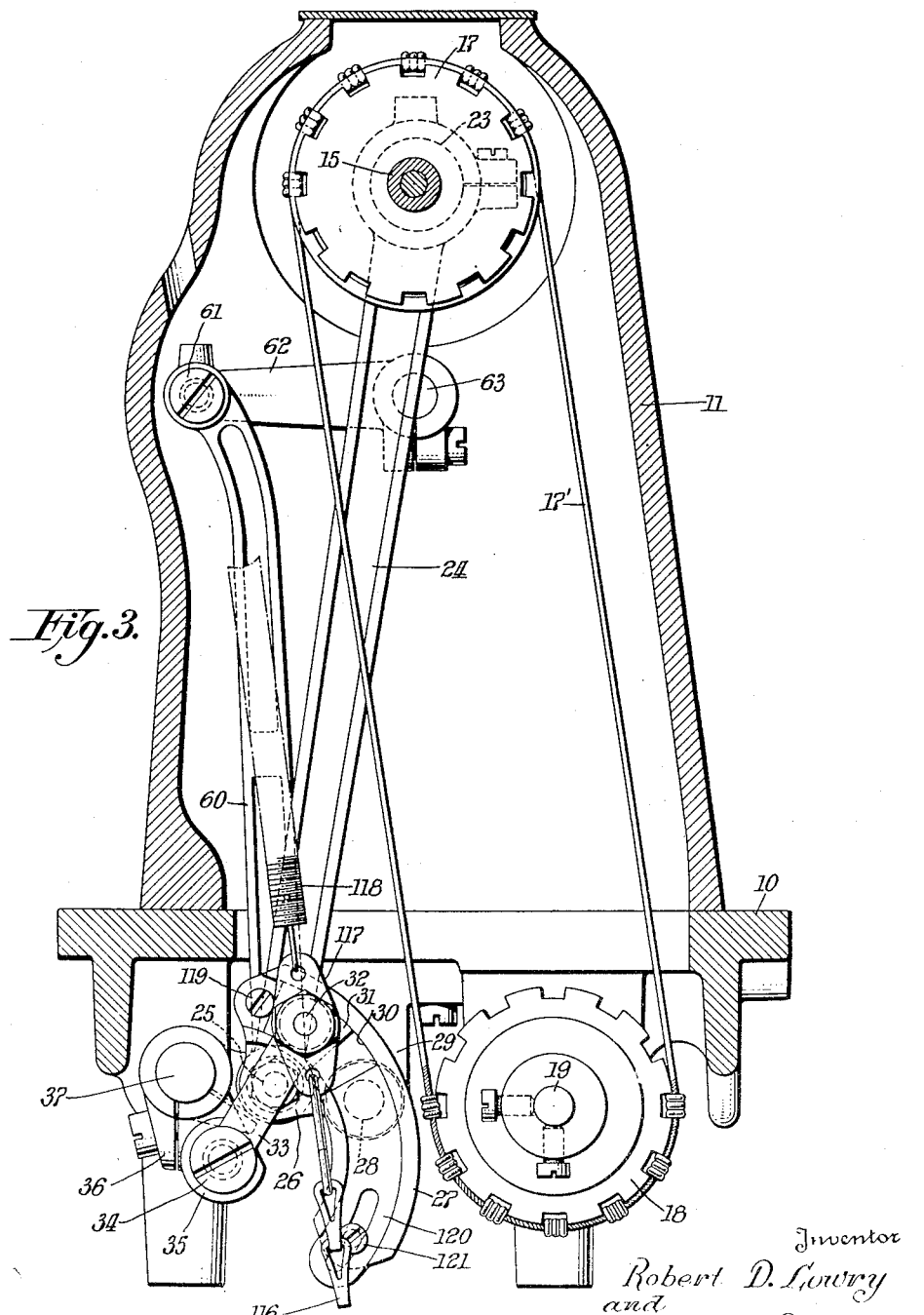

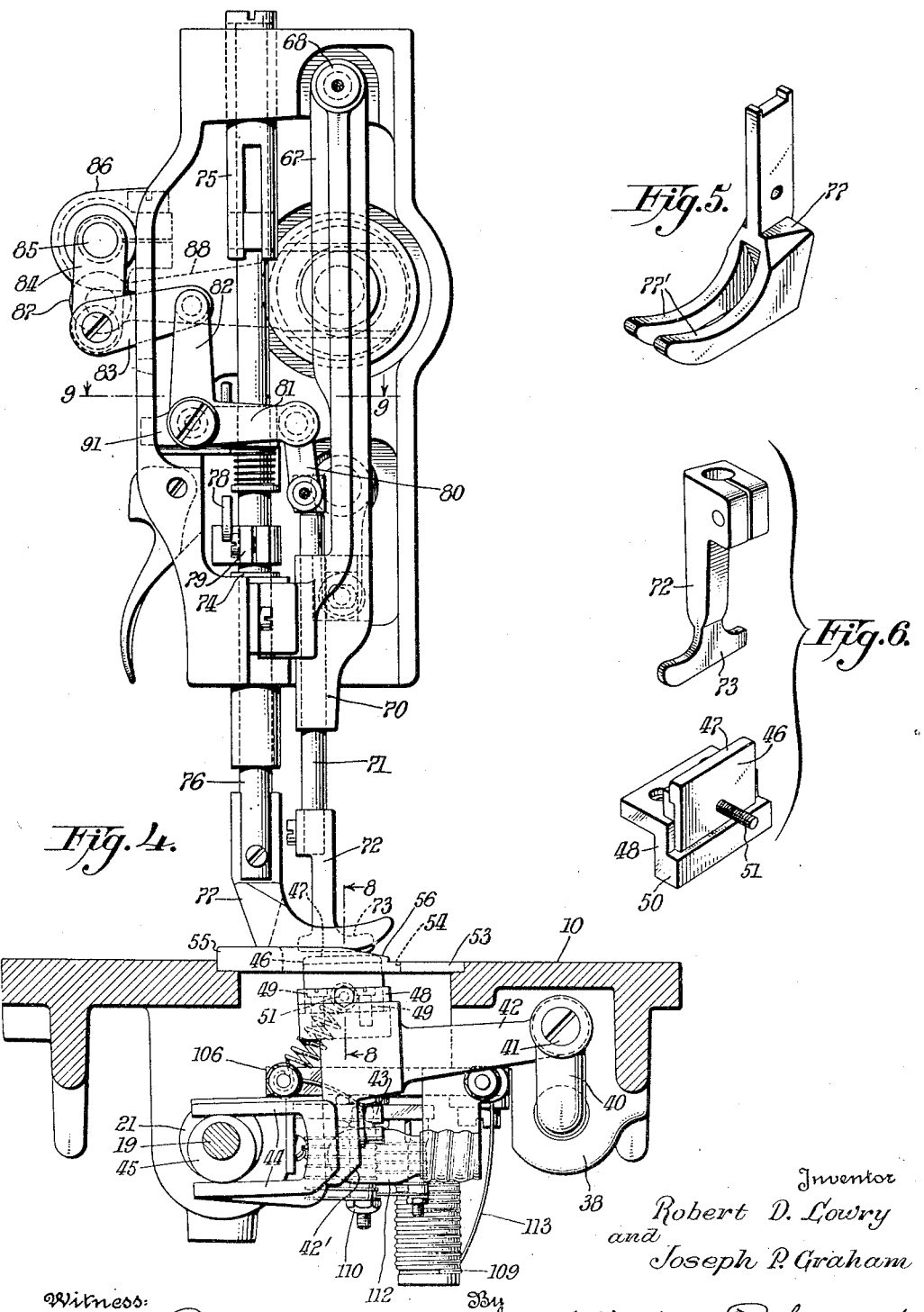

2,473,143

UNITED STATES PATENT OFFICE 2,473,143

ELECTROSTATIC BONDING MACHINE

Joseph P. Graham and Robert D. Lowry, Midland, Mich., assignors to The Singer Manufacturing Company, Elizabeth, N. J., a corporation of New Jersey Application February 7, 1945, Serial No. 576,657

8 Claims. (Cl. 154—42)

1

This invention relates to apparatus for bonding work-plies of sheet materials by the use of a high frequency electric current and, while more particularly designed for bonding plies of thermoplastic or thermosetting materials, the invention is also adapted for use in uniting non-thermoplastic plies by means of adhesives having thermoplastic properties.

The primary object of the present invention is to provide an apparatus for progressively bonding superposed work-plies at a production rate substantially greater than has been heretofore possible with apparatus of prior construction, thereby to make it commercially practicable to employ a high frequency electrostatic bonding apparatus for progressively bonding plies of materials.

Another object of the invention is to provide an apparatus insuring satisfactory bonding of plies progressively at high speeds, in straight or irregular and curved lines as may be required by the nature of the work.

The invention has also for its object to provide an electrostatic bonding apparatus including controlling means for at will regulating the speed of advance of work-plies between opposed and relatively reciprocatory electrodes in a high frequency circuit.

A further object of the invention is to provide an electrostatic bonding apparatus having controlling means for at will varying the frequency of intermittent engagement of work-plies by a reciprocatory electrode in the same area of said plies.

A still further object of this invention is to provide means readily accessible to the operator, for quickly tuning out the capacitive component of the load at the oscillator frequency.

A further and more specific object of the invention is to provide opposed electrodes which are actuated to intermittently engage the work and to impart a step-by-step advancing movement thereto, whereby the bonding of the plies occurs during the feeding movement of the work and over an area defined by the size and shape of the electrodes.

The apparatus comprises an electrostatic bonding apparatus having opposed electrodes between which superposed plies of materials to be bonded are intermittently advanced progressively; said electrodes being relatively moved to clamp the work-plies intermittently therebetween and said electrodes being connected to a high frequency source of electric current.

With the above and other objects in view, as

2 will hereinafter appear, the invention comprises the devices, combinations and arrangements of parts hereinafter set forth and illustrated in the accompanying drawings of a preferred embodiment of the invention, from which the several features of the invention and the advantages attained thereby will be readily understood by those skilled in the art.

In the drawings:

Fig. 1 is a front elevation showing the machine supported on a table with the driving and control means located beneath the table.

Fig. 2 is a vertical section taken substantially through the center of the machine, the operative parts being shown in elevation.

Fig. 3 is a vertical section taken substantially along the line 3—3 of Fig. 2.

Fig. 4 is a vertical sectional view taken along the line 4—4 of Fig. 2, the face-plate of the machine being removed to expose the operating parts within the hollow head.

Fig. 5 is an enlarged detailed view of the presserfoot.

Fig. 6 is an enlarged detailed view of the electrodes.

Fig. 7 is a bottom plan view of the machine.

Fig. 8 is an enlarged vertical section taken through the electrodes and substantially along the line 8—8 of Fig. 4.

Fig. 9 is an enlarged detailed sectional view of mechanism within the hollow head, the section being taken along the line 9—9 of Fig. 4.

In the embodiment of the invention selected for illustration, the improved machine comprises a metal frame having a bed or base 10 with a flat upper surface forming a work-support. The base 10 carries an overhanging bracket-arm 11 terminating in a hollow head 12.

Journaled in bearings 13 and 14 in the bracket-arm 11 is a main shaft 15 having a balance wheel and pulley 16 secured to one of its ends. Located between the bearings 13 and 14 and secured to the shaft 15, is a pulley 17 which is operatively connected by a clip-belt 17' to a pulley 18 secured to the end of a rotary shaft 19 located below the bed 10 and journaled in bearings 20, 21 and 22 carried by the bed 10.

Secured to the main shaft 15 at a point adjacent the pulley 17 is an adjustable eccentric 23 which actuates a pitman 24. The adjustment of the eccentric 23 may be effected by means of a knurled nut 23' (Fig. 1) at the outer end of the main shaft 15 and in the manner disclosed in the Dial et al. Patent No. 718,988, dated January 27, 1903, to which reference may be had for a more complete and detailed description. The lower end of the pitman 24 is pivotally connected at 25 to an arm 26 formed on a segment 27 carried by a rock-shaft 28 which is journaled in a bearing 29 fixed to the under side of the bed 10.

The segment 27 is formed with a track or slideway 30 which receives a slide-block 31 apertured to receive a pivot-pin 32 carried by one end of a link 33. The other end of the link 33 is pivotally secured at 34 to the free end of an arm 35 clamped by a split hub 36 to a rock-shaft 37 located beneath the bed and journaled in bearings 38 formed on the bed 10.

The rock-shaft 37 is formed with two spaced upstanding arms 40 between the free ends of which is pivotally mounted on the pivot pin 41 the transverse apertured boss of an electrode carrying bar 42. Adjustably secured by a screw 43 passing through an elongated slot in a depending lug 42' formed on the bar 42 is a fork having spaced arms 44 which embrace an electrode lifting eccentric 45 secured to and rotatable with the shaft 19. An electrode 46 having a rectangularly shaped work-engaging face 47 is carried by and actuated by the bar 42. To electrically insulate the electrode 46 from the bar 42 on which it is carried, there is interposed between the bar and the electrode a piece of polystyrene 48 (Figs. 4, 6 and 8). The polystyrene is secured to the bar 42 by the screws 49 and is formed with a step-like portion 50 against which the lower edge of the electrode 46 is seated. The electrode 46 is secured to the polystyrene 48 by a screw 51 which also serves as a binding post for an electrical connection to the electrode. The work-plate or bed 10 has removably secured to it an auxiliary work-supporting plate 53 formed with a slot 54 through which the electrode 46 operates. At its forward end, the plate 53 is substantially flush with the upper face of the bed 10, while the rearward portion 55 of said plate is thickened to extend above the bed 10. Intermediate its ends, the plate 53 has a rearwardly upwardly inclined portion 56; the described construction facilitating the use of attachments.

Clamped to the rock-shaft 37, by the split hub 57, is an arm 58 carrying an elongated and shouldered pivot-pin 59. To the free end of the pivot-pin 59 there is pivotally secured the lower end of a link 60, the upper end of which is pivoted at 61 to an arm 62 clamped on an upper rock-shaft 63. The rock-shaft 63 is arranged parallel to the rotary main shaft 15 and is journaled in bearings 64 formed in the bracket-arm. One of the ends of the rock-shaft 63 terminates in the hollow head 12, and fixed to this end is a bent crank arm 65 having a pin 66 which is operatively connected to a vibratory frame 67 pivotally supported at its upper end upon a pivot-pin 68 fixed in the head 12, whereby the frame 67 is confined to swinging movements in a vertical plane transverse to the length of the rock-shaft 63.

The frame 67 is formed with a bearing 70 in which is journaled a reciprocatory upper vertically arranged tubular bar 71 carrying at its lower end a shank 72 terminating in an upper electrode 73 which cooperates with the lower electrode 46 to clamp and feed the work. Journalled in bearings 74 and 75 in the head 12 is a presser-bar 76 having secured to its lower end a clamping foot 77 formed with a bifurcated toe portion 77' which straddles the upper electrode 73 and which cooperates with the work-supporting plate 53 to clamp the work therebetween during the period between work advancing movements of the upper and lower electrodes. The presser-bar is constantly urged downwardly by a flat adjustable spring 78, one end of which bears on a collar 79 clamped to the presser-bar 76.

In order to impart rising and falling movements to the electrode bar 71, there is pivotally connected to the upper end of the bar 71 one end of a short link 80, the opposite end of which is pivoted to an arm 81 of a bell-crank lever 81, 82. The other arm 82 of the bell-crank lever is connected by a link 83 to a depending arm 84 of a rock-shaft 85 disposed substantially parallel to the main shaft 15 and journaled in bearing lugs 86 extending rearwardly from the bracket-arm 11. The rock-shaft 85 has secured to it a crank-arm 87 the end of which is pivotally connected to a pitman 88 provided with a strap 89 embracing an adjustable eccentric 90 secured to the main-shaft 15. The bell-crank lever 81, 82, is fulcrumed upon a supporting block 91 carried by the presser-bar 76 and it will be understood that the clamping foot 77 and the upper electrode 73 will be reciprocably actuated to alternately engage the work. For a more detailed description of the mechanism for actuating the clamping foot 77 and the electrode 73 to cause them to alternately engage the work, reference may be had to the Hale Patent No. 2,329,160 dated September 7, 1943.

The above described machine is adapted to be supported upon a table-top 93 supported by legs 94. Carried at the under side of the table top 93 is an electric transmitter 94' of the type shown and described in the Peets et al. patent, No. 2,004,055 for a Unitary electric motor and power transmitter. The pulley 95 on the transmitter is operatively connected to the pulley on the balance wheel 16 by means of a belt 96 which serves to transmit power from the pulley 95 to the main shaft 15 of the machine. The transmitter is operated by a pivotally supported treadle 97 acting through a rod 98 having one end connected to the treadle 97 and its other end connected to the operating lever 99 of the transmitter 94.

To start the machine, the operator pushes down the toe-portion of the treadle 97; this causes the transmitter clutch to engage and, through the pulley 95, belt 96 and balance wheel 16, to rotate the main shaft 15 of the machine. Rotation of the main-shaft 15, through the pulleys 17 and 18 and the clip belt 17', causes the shaft 19 to rotate in unison therewith. Rotation of the machine shaft 15 also causes the adjustable eccentric 23 to actuate the pitman 24 and rock the segment 27 about its pivot 28. This rocking movement of the segment 27 is imparted to the rock-shaft 37 by the link 33 and arm 35. As the electrode carrying bar 42 has one end pivoted between the upstanding arms 40 on the rock-shaft 37 the bar 42 has imparted to it a back and forth movement when the shaft 37 is rocked, and as the other end of the bar embraces the eccentric 45 fixed on the shaft 19 this end of the bar is given a rising and falling movement when the shaft 19 is rotated. The electrode 46 is carried intermediate the ends of the bar 42 and, as the shaft 19 and rock-shaft 37 are actuated by the main shaft 15 in the proper timed relation, the electrode 46 is given a four motion movement, these movements occurring in the order of; a rising movement, a forward movement, a falling movement and a return movement.

The rock-shaft 63 is operatively connected to the rock-shaft 37 and operates in unison therewith to impart a swinging movement to the frame 67 about its pivot 68. The swinging of the frame 67 imparts a back and forth movement to the electrode bar 71 and electrode 73. Concurrently, the electrode bar 71 is given a rising and falling movement by the eccentric 90 on the main shaft 15 through the operative connections heretofore described. From the above, it will be understood that the opposed electrodes 46 and 73 are each given a four motion movement and these movements are complemental to each other so that when sheets of material are placed between the electrodes the material will be intermittently clamped between the electrodes and fed forward. During the interval between the forward feeding movements of the electrodes, the material is clamped between the clamping foot 77 and the raised portion 55 of the throat-plate 53. It will be observed that the bell-crank lever 81, 82 is fulcrumed on the block 91 secured to the presser-bar 76 and, therefore, when the electrode 73 descends and engages the work the bell-crank lever 81, 82 acts to raise the spring biased clamping foot 77 from the work, and when the electrode 73 is raised the clamping foot will descend and engage the work. It will also be observed that after the eccentric 90 has been adjusted to give to the electrode the correct amount of vertical movement, the height the electrode 73 will be raised above the work remains constant, and is not affected by the thickness of the material or the work. This is due to the fact that the position of the presser-bar 76 is affected by the thickness of the material passing through the machine and if, for example, a thick portion of material is encountered the presser-bar is raised and the fulcrum point of the bell-crank lever 81, 82 is also raised, therefore, the relation between the electrode carrying bar 71 and the presser-bar 76 remains constant and the lift of the electrode 73 above the surface of the material remains constant.

It is well known that thermoplastic and thermosetting sheets or plies of material may be welded or bonded together without the use of an adhesive material therebetween by subjecting superposed plies of the material to heat and pressure. It is also well known that heat is generated in plastics having dielectric properties by means of the dielectric loss produced in them when they are subjected to a high frequency field. In order to establish a high frequency field between the electrodes 46 and 73 we have provided a high-voltage D. C. power supply 100 of conventional design and having a variable output up to 1000 volts at 200 milliamperes. This variation in output is obtained by means of an adjustable transformer. The transformer may be readily adjusted at the will of the operator by means of the knob 101 on the power supply 100. The power supply is adapted to be electrically connected to an ordinary 110 volt, 60 cycle, A. C. circuit. The power supply 100 is connected to a high frequency oscillator 102 which operates at a frequency of 30 megacycles, with an output of approximately 50 watts. The above is merely by way of illustration and it will be understood that the voltage of the power supply and the frequency and output of the oscillator may be over a wide range and is dependent upon the thickness and power factor of the material and also the rate of feed of the material through the machine.

A coaxial cable 103 electrically connects the oscillator 102 with terminals 104 and 105 carried by a plate 106 of insulating material, preferably polystyrene. An air-core inductance coil 107, connected between the terminals 104 and 105, is employed to tune the coaxial cable 103 to resonance with the oscillator frequency. It is well known that the coaxial cable 103, being of a length less than ¼ of a wave length of the oscillator frequency, acts like a capacitance to the oscillator; hence an inductance 107 is used at the receiving end of the coaxial cable to tune out said capacitance. The terminal 105 is electrically connected by the conductor 108 to the machine frame, which for this circuit will be considered the ground. The other terminal 104 is connected in series through an inductance coil 109 and a variable capacitor 110 to the lower electrode 46. It will be understood that the above described circuit from terminal 104 to electrode 46 is carried by the insulating plate 106 and is, therefore, insulated from ground.

The load circuit may now be traced from terminal 105 through conductor 108 to the machine frame or ground thence through the metal parts of the machine to the upper electrode 73, thence through the plies of plastic material 111 (Fig. 8) to the lower electrode 46, thence through capacitor 110 and inductance 109 to the terminal 104. It will be understood that the plastic sheets 111 between the electrodes 46 and 73 constitute a load having capacitive and resistive components. The inductance 109 and capacitor 110 in series with this load are employed to tune out the said capacitive component of the load at the oscillator frequency. Whereas this might also be effected by means of a single tapped inductance, we have found it more practical to employ an unnecessarily large inductance 109 together with a variable capacitor 110 and to adjust said capacitor to change the overall inductance. For optimum results, it is obvious that in changing from one thickness of plastic material to another thickness, or in changing from one type of material to another, it is necessary to readjust the capacitor 110 to compensate for the change in the capacitive component of the load. A neon lamp 112 has one of its terminals electrically connected by the conductor 113 to a point in the circuit between the terminal 104 and the inductance coil 109. The other terminal of the neon lamp is left unconnected. This lamp is used as a tuning indicator, to inform the operator that the load circuit has been properly adjusted to resonance with the oscillator frequency. In the circuit shown, this will occur when the lamp reaches its greatest brightness.

For a given frequency and voltage, the thickness and loss factor of the material determine the rate at which the material should be fed through the machine. As previously stated, the throw of the eccentric 23 may be varied by means of the knurled nut 23'. The eccentric 23, through the hereinbefore described mechanism, actuates the electrodes to produce their forward feeding movement and it is obvious that by adjusting the throw of the eccentric 23 the length of forward feeding movement may be adjusted so that the desired rate of feed of the material may be obtained.

In some types of work, the machine may be required to bond together plies of material and at intervals a cross-seam may be encountered which for a short period of time introduces more plies of material between the electrodes. This sudden increase in thickness of the material may be compensated for by either increasing the output of the oscillator or by reducing the rate of feed to cause the increase in thickness to be acted upon by the electrodes a greater number of times. In order to reduce the rate of feed of the material we have provided manual means under the control of the operator for readily and quickly reducing the rate of feed during the operation of the machine and for automatically returning the machine to its original rate of feed. This means comprises a treadle 115 connected by a chain 116 to a plate 117 pivotally mounted on the pivot-pin 32 carried by one end of the link 33. A tension spring 118 has one of its ends connected to the plate 117 and its other end suitably secured (not shown) to the frame of the machine. The spring 118 constantly urges the pivot-pin 32 and the slide-block 31 which receives the pin 32 against a stop screw 119 located in the slide-way 30, and as the segment 27 rocks back-and-forth about the center of the rock-shaft 28 as an axis, the maximum forward feeding movement of the electrodes occurs, for a given setting of the adjustable eccentric 23, when the slide-block 31 and pivot-pin are in the position shown in Fig. 3. When the operator depresses the treadle 115, the chain 116 pulls the slide-block 31 and pivot-pin 32, against the action of the spring 118, along the slideway 30 towards the axis about which the segment oscillates. As the slide-block 31 and pivot-pin 32 approach this axis the amplitude of movement imparted by the segment 27 to the link 33 decreases and, consequently, the forward feeding movement of the electrodes decreases, thereby reducing the rate of feed of the material through the machine. The reduced rate of feed may be predetermined by means of a stop 120 located in the slide-way of the segment 27 and adjustably secured to the segment by the screw and slot 121.

From the foregoing, it will be observed that the electrodes 46 and 73, which are spaced from each other to provide a bonding zone, may be adjusted for a predetermined amplitude of forward feeding movement so that the material will be advanced a predetermined amount for each rotation of the main shaft 15, and that this predetermined amount of feed may be quickly and easily reduced a predetermined amount during the operation of the machine at the will of the operator. It will also be understood that the electrodes 46 and 73 may be readily removed from the machine and other electrodes having work-engaging surfaces of different length substituted. When electrodes having work-engaging surfaces of short length are used and a feeding movement given to the electrodes which is longer than the work-engaging surface of the electrodes a series of spot-welds will be formed. To make a continuous air-tight seam, we prefer to use an electrode having a work-engaging surface of substantially ¾ of an inch. When an electrode of the above length is used and the rate of feed is approximately one inch for every twelve revolutions of the main shaft 15 it is obvious that there is considerable overlap, with the result that any given point on the continuously welded seam will be acted upon by the electrodes a plurality of times. This produces a continuous welded seam.

In order to raise the clamping foot 77 and electrode 73 from the work, we have provided a knee-lever 122 (Fig. 1) pivoted at the under side of the table 93. The lever 122 has a portion 124 which acts to raise the rod 125 and shift the lever 126 about its pivot 127. The end of the lever 126 is connected to a second lever 128 pivoted to the head of the machine at 129. The lever 128 extends under the block 91 fixed to the presser-bar 76 and it is apparent that when the presser-bar is raised the clamping foot 77 and electrode 73 will be raised above the throat-plate.

It will be observed that the electrical connections from the oscillator to the electrode 46 are located below the machine frame and, consequently, these connections are out of the way of the operator and in a position in which they cannot be inadvertently touched.

It will be understood that the knob 110' of the adjustable capacitor 110 is located directly beneath a removable cover-slide 130 so that access may be had to the knob 110' from above the work-support and in the operative position of the machine upon the table for the purpose of readily adjusting the capacitor 110.

From the foregoing description, considered in connection with the accompanying drawings, the construction, manner of operation and several advantages of our improved electrostatic bonding machine will be clearly and fully understood. It is apparent that such a machine has a wide variety of uses and it will be understood that the form, construction and arrangement of the several elements employed may be varied. The privilege is therefore reserved of resorting to all such legitimate changes therein as may be fairly embodied within the spirit and scope of the appended claims.

Having thus set forth the nature of the invention, what we claim herein is:

1. A machine for bonding plies of dielectric material comprising, a frame including a work-support, a shaft journaled in said frame, electrodes carried by said frame and located relative to each other to provide a bonding zone, an electronic high frequency oscillator electrically connected to said electrodes for establishing a high frequency field in said zone, means operated by said shaft for imparting relative movement to said electrodes toward each other to cause them to clamp the material and for imparting feed and return movements to said electrodes to intermittently advance the material through said zone, and a presser-member for holding the material against said work-support on the return movement of the electrodes.

2. A machine for bonding plies of dielectric material comprising, a frame, a shaft journaled in said frame, electrodes carried by said frame and located relative to each other to provide a bonding zone, an electronic high frequency oscillator electrically connected to said electrodes for establishing a high frequency field in said zone, means operated by said shaft for imparting relative reciprocating movement to the electrodes to cause them to clamp the material and to impart to the electrodes work feeding movements while they are in engagement with the material, means for predetermining the amount of feeding movement imparted to said electrodes, and manual means under control of the operator for at will varying the amount of feeding movement imparted to the electrodes.

3. A machine for bonding plies of dielectric material comprising, a frame including a work-support, a shaft journaled in said frame, electrodes carried by said frame and located relative to each other to provide a bonding zone, an electronic high frequency oscillator electrically connected to said electrodes for establishing a high frequency field in said zone, mechanism actuated by said shaft for imparting unison four-motion material feeding movements to said electrodes once for each rotation of said shaft, said electrodes being arranged to engage the material and impart to it an intermittent feeding movement and a clamping member actuated by said shaft for clamping the material against the work-support in the intervals between its feeding movement.

4. A machine for bonding plies of thermoplastic dielectric material, comprising a pair of electrodes located relative to each other to provide a bonding zone, each of the electrodes having an elongated flat work-engaging surface, an electronic oscillator electrically connected to the electrodes to establish a high frequency electrostatic field between them, and automatic mechanism for intermittently moving the electrodes into engagement with the material and for imparting step-by-step feeding movements to the electrodes while they are in engagement with the material.

5. A machine for forming a continuous welded seam between plies of thermoplastic dielectric material comprising a pair of opposed electrodes, each of which has an elongated, substantially rectangularly shaped, flat work-engaging surface, a high frequency electric oscillator connected to said electrodes for establishing a high-frequency electrostatic field therebetween, and automatic means for intermittently moving the electrodes into engagement with the material and for imparting to the electrodes step-by-step feeding movements such that the advance of the material at each step is less than the length of the electrodes.

6. In a machine for bonding together plies of material which become plastic when subjected to a high frequency electric field, a frame, a pair of opposed electrodes carried by said frame, one of said electrodes being electrically insulated from said frame, a high frequency oscillator, electrical connections between said oscillator and said electrodes for establishing a high frequency field between said electrodes, mechanism for reciprocating said electrodes toward and away from each other to cause them alternately to engage and disengage the plies of material, and means for imparting to said electrodes a work advancing movement while they are in engagement with the material and a return movement when they are disengaged from the material.

7. In a machine for bonding together plies of material which become plastic when subjected to a high frequency electric field, a frame, a pair of opposed electrodes carried by said frame, one of said electrodes being electrically insulated from said frame, a high frequency oscillator, electrical connections between said oscillator and said electrodes for establishing a high frequency field between said electrodes, automatic mechanism for reciprocating said electrodes to cause them to intermittently and yieldingly clamp the material therebetween, and feeding mechanism for imparting a feeding movement to the electrodes while the material is yieldingly clamped between said electrodes.

8. In a machine for bonding together plies of material which become plastic when subjected to a high frequency electric field, a frame, a pair of opposed electrodes carried by said frame, one of said electrodes being electrically insulated from said frame, a high frequency oscillator, electrical connections between said oscillator and said electrodes for establishing a high frequency field between said electrodes, automatic mechanism for rapidly reciprocating said electrodes toward and away from each other to cause them to yieldingly engage and disengage the material, means operating in timed relation with said automatic mechanism for imparting a feeding movement to the electrodes while they are in engagement with the material and a return movement when they are disengaged from the material, and an intermittently operating clamping member for holding said material stationary while the electrodes are executing their return movement.

JOSEPH P. GRAHAM.
ROBERT D. LOWRY.

REFERENCES CITED

The following references are of record in the file of this patent:

UNITED STATES PATENTS

| Number | Name | Date |
|---|---|---|
| 989,538 | Rontke | Apr. 11, 1911 |
| 1,097,864 | Knopf et al. | May 26, 1914 |
| 1,998,322 | Kaar | Apr. 16, 1935 |
| 2,128,031 | Myers | Aug. 23, 1938 |
| 2,130,758 | Rose | Sept. 20, 1938 |
| 2,147,689 | Chaffee | Feb. 21, 1939 |
| 2,248,840 | Wilkoff | July 8, 1941 |
| 2,254,794 | Card | Sept. 12, 1941 |
| 2,308,043 | Bierwirth | Jan. 12, 1943 |
| 2,322,298 | Johnston | June 22, 1943 |
| 2,324,068 | Crandell | July 13, 1943 |
| 2,329,484 | Quist | Sept. 14, 1943 |
| 2,333,650 | Babo et al. | Nov. 9, 1943 |
| 2,396,004 | Gilbert | Mar. 5, 1946 |
| 2,406,714 | Strickland, Jr. | Aug. 27, 1946 |

FOREIGN PATENTS

| Number | Country | Date |
|---|---|---|
| 556,292 | Great Britain | Sept. 28, 1943 |

OTHER REFERENCES

Slater, "Microwave Transmission," 1942 (first edition, fourth impression), McGray-Hill Book Co., Inc., N. Y., pp. 43, 47, 53–55, 64 and 66.

Taylor, "Heating Wood with Radio-Frequency Power," Transactions of the A. S. M. E., April 1943, pp. 201–212, particularly p. 210.

Hoyler, "An Electronic 'Sewing Machine'," Electronics, August 1943, pp. 91 and 92.

Bierwirth et al., "Radio-Frequency Heating applied to Wood Gluing," Proceedings of the Institute of Radio Engineers, October 1943, pp. 529–537.